United States Patent [19]
Becker et al.

[11] Patent Number: 5,732,200
[45] Date of Patent: Mar. 24, 1998

[54] INTEGRATION OF GROUPWARE WITH QUALITY FUNCTION DEPLOYMENT METHODOLOGY VIA FACILITATED WORK SESSIONS

[75] Inventors: Timothy Leo Becker, Endicott; Philip David Heinlein, Binghamton; James Allen Martin, Jr., Endicott; Richard Daniel Orth, Owego, all of N.Y.

[73] Assignee: International Business Machines Corporation, Armonk, N.Y.

[21] Appl. No.: 726,232

[22] Filed: Oct. 4, 1996

Related U.S. Application Data

[63] Continuation of Ser. No. 616,238, Mar. 13, 1996, abandoned, which is a continuation of Ser. No. 466,856, Jun. 6, 1995, abandoned, which is a continuation of Ser. No. 248,616, May 23, 1994, abandoned, which is a continuation-in-part of Ser. No. 229,967, Apr. 19, 1994, abandoned.

[51] Int. Cl.$^6$ .................................................. G06F 3/14
[52] U.S. Cl. .................. 395/114; 395/331; 395/962; 395/971
[58] Field of Search ............... 395/114, 115, 395/117, 101, 110, 112, 329, 330, 331, 332

[56] References Cited

U.S. PATENT DOCUMENTS

| | | | |
|---|---|---|---|
| 4,807,154 | 2/1989 | Scully et al. | 364/518 |
| 4,977,520 | 12/1990 | McGaughey, III et al. | 364/521 |
| 5,124,912 | 6/1992 | Hotaling et al. | 364/401 |
| 5,167,011 | 11/1992 | Priest | 395/54 |
| 5,195,086 | 3/1993 | Baumgartner et al. | 395/331 |
| 5,197,000 | 3/1993 | Vincent | 364/401 |
| 5,206,934 | 4/1993 | Naef, III | 395/331 |
| 5,208,748 | 5/1993 | Flores et al. | 364/419 |
| 5,216,603 | 6/1993 | Flores et al. | 364/419 |
| 5,224,204 | 6/1993 | Tsuruta et al. | 395/51 |
| 5,263,869 | 11/1993 | Ziv-El | 434/336 |
| 5,287,194 | 2/1994 | Lobiondo | 358/296 |
| 5,327,526 | 7/1994 | Nomura et al. | 395/115 |
| 5,353,388 | 10/1994 | Motoyama | 395/117 |
| 5,369,764 | 11/1994 | Blair | 395/650 |
| 5,388,165 | 2/1995 | Deaton et al. | 382/7 |
| 5,539,886 | 7/1996 | Aldred et al. | 395/329 |
| 5,557,726 | 9/1996 | Yoshizawa | 395/330 |

Primary Examiner—Raymond J. Bayerl
Assistant Examiner—Steven P. Sax
Attorney, Agent, or Firm—Douglas M. Clarkson

[57] ABSTRACT

A network application for automatically formatting and printing documents to be used as planning manuals by company personnel to produce quality products designed to satisfy customer preferences. Output documents can also be used as educational manuals and for dispersing among organizational personnel common information for integrated strategic planning and decision making for engineering and marketing teams. Facilitated collaborative work sessions among work groups inputting and sharing comments and ideas provide starting data to the network application.

30 Claims, 11 Drawing Sheets

FIG.1  QFD-HOUSE OF QUALITY

```
┌─────────────────────────────────────────────────────────┐
│ USE TEAMFOCUS IDEA ORGANIZATION OR GROUP OUTLINER TO    │
│ BRAINSTORM CUSTOMER WANTS AND NEEDS FOR THE PRODUCT     │
│ OR SERVICE                                              │
└─────────────────────────────────────────────────────────┘
                            │
                            ▼
┌─────────────────────────────────────────────────────────┐
│ REVIEW THE RESPONSES OF THE PARTICIPANTS AND CONSOLIDATE│
│ THEM INTO A LIST OF CUSTOMER ATTRIBUTES. GAIN CONSENSUS │
│ FROM THE GROUP.                                         │
└─────────────────────────────────────────────────────────┘
                            │
                            ▼
┌─────────────────────────────────────────────────────────┐
│ USE TEAMFOCUS TOPIC COMMENTER OR GROUP OUTLINER TO      │
│ DOCUMENT ADDITIONAL INFORMATION FOR EACH ATTRIBUTE.     │
│ SUPPORTING COMMENTS SHOULD BE RECORDED IN THE EXACT WORDS│
│ OF THE CUSTOMER WHENEVER POSSIBLE                       │
└─────────────────────────────────────────────────────────┘
                            │
                            ▼
┌─────────────────────────────────────────────────────────┐
│ USE TEAMFOCUS ALTERNATIVE EVALUATION OR GROUP MATRIX    │
│ TO RATE EACH ATTRIBUTE ON A 1-10 SCALE AGAINST THE      │
│ FOLLOWING CRITERIA - RELATIVE IMPORTANCE, SATISFACTION  │
│ WITH CURRENT PRODUCT OR SERVICE, AND SATISFACTION WITH  │
│ ONE OR MORE COMPETITORS PRODUCTS OR SERVICES.           │
└─────────────────────────────────────────────────────────┘
                            │
                            ▼
┌─────────────────────────────────────────────────────────┐
│ SAVE TEAMFOCUS SESSION OUTPUT TO DISKETTE. LOAD SESSION │
│ OUTPUT INTO MICROSOFT ACCESS OR OTHER DATABASE TOOL FOR │
│ STORAGE AND RETIEVAL                                    │
└─────────────────────────────────────────────────────────┘
                            │
                            ▼
┌─────────────────────────────────────────────────────────┐
│ CREATE DATABASE EXPORT FILE. RUN QFD BRIDGE PROGRAM     │
│ TO CREATE QFD/CAPTURE IMPORT FILE FROM DATABASE EXPORT  │
│ FILE.                                                   │
└─────────────────────────────────────────────────────────┘
                            │
                            ▼
┌─────────────────────────────────────────────────────────┐
│ LOAD DATA INTO QFD/CAPTURE USING QFD/CAPTURE IMPORT     │
│ UTILITY. CREATE HOUSE OF QUALITY.                       │
│     CUSTOMER ATTRIBUTES ─────────► WHAT'S               │
│     TF AE CRITERIA     ─────────► WHY'S                 │
│     TF AE RATINGS      ─────────► WHAT'S VS WHY'S       │
└─────────────────────────────────────────────────────────┘
```

QFD-CUSTOMER WANTS AND NEEDS EXERCISE

FIG.3

```
┌─────────────────────────────────────────────────────────┐
│ USE TEAMFOCUS IDEA ORGANIZATION OR GROUP OUTLINER TO    │
│ BRAINSTORM PRODUCT CHARACTERISTICS THAT RELATE TO THE   │
│ CUSTOMER ATTRIBUTES                                     │
└─────────────────────────────────────────────────────────┘
                            │
                            ▼
┌─────────────────────────────────────────────────────────┐
│ REVIEW THE RESPONSES OF THE PARTICIPANTS AND CONSOLIDATE│
│ THEM INTO A LIST OF PRODUCT CHARACTERISTICS. GAIN       │
│ CONSENSUS FROM THE GROUP.                               │
└─────────────────────────────────────────────────────────┘
                            │
                            ▼
┌─────────────────────────────────────────────────────────┐
│ USE TEAMFOCUS GROUP MATRIX TO IDENTIFY THE              │
│ RELATIONSHIPS BETWEEN EACH CUSTOMER ATTRIBUTE AND       │
│ PRODUCT CHARACTERISTICS. SET SCALE TO RANGE FROM        │
│ -9 (STRONG NEGATIVE) TO +9 (STRONG POSITIVE).           │
└─────────────────────────────────────────────────────────┘
                            │
                            ▼
┌─────────────────────────────────────────────────────────┐
│ USE TEAMFOCUS GROUP MATRIX TO IDENTIFY THE              │
│ RELATIONSHIPS AMONG THE PRODUCT CHARACTERISTICS.        │
│ SET SCALE TO RANGE FROM -9 (STRONG NEGATIVE) TO         │
│ +9 (STRONG POSITIVE).                                   │
└─────────────────────────────────────────────────────────┘
                            │
                            ▼
┌─────────────────────────────────────────────────────────┐
│ SAVE TEAMFOCUS SESSION OUTPUT TO DISKETTE. LOAD SESSION │
│ OUTPUT INTO MICROSOFT ACCESS OR OTHER DATABASE TOOL FOR │
│ STORAGE AND RETRIEVAL.                                  │
└─────────────────────────────────────────────────────────┘
                            │
                            ▼
┌─────────────────────────────────────────────────────────┐
│ CREATE DATABASE EXPORT FILE. RUN QFD BRIDGE PROGRAM     │
│ TO CREATE QFD/CAPTURE IMPORT FILE FROM DATABASE EXPORT  │
│ FILE.                                                   │
└─────────────────────────────────────────────────────────┘
                            │
                            ▼
┌─────────────────────────────────────────────────────────┐
│ LOAD DATA INTO QFD/CAPTURE USING QFD/CAPTURE IMPORT     │
│ UTILITY. CREATE HOUSE OF QUALITY.                       │
│   PRODUCT CHARACTERISTICS  ──────▶  HOW'S               │
│       TF GM RATINGS ─────────────▶  WHAT'S VS HOW'S     │
│       TF GM RATINGS ─────────────▶  HOW'S VS HOW'S      │
└─────────────────────────────────────────────────────────┘
```

QFD-PRODUCT CHARACTERISTICS EXERCISE

FIG.4

EXPORTIO – Export Utility from GroupWare to DBase III database (1) Prompt User for path to Session Information file and verify that it exists
(2) Fill a list box with each Session Name available
(3) Set default source and destination paths as current directory
(4) Verify user selections
(5) Open the output Database file
(6) Read the first record from the Item List file and assign to Idea
(7) As long as there are records in the input file, do the following:
(8) Read the next line and assign value to Comment File variable
(9) If Comment File exists then do the following:
(10) Read record from Comment File
(11) Comment = Comment File record
(12) As long as there are records, do the following:
(13) Read record from Comment File
(14) Append Carriage Return character, Line Feed character, and Comment File record to Comment
(15) 
(16) Loop back to step (12)
(17) Write record to Database file
(18) Read the next line from Item List file and assign to Idea
(19) Loop back to step (7)
(20) Exit the Program

EXPORTAE - Export Utility from GroupWare to DBase III database

1) Prompt User for path to Session Information file and verify that it exists
2) Fill a list box with each Session Name available
3) Set default source and destination paths as current directory
4) Verify user selections
5) Open the Alternatives output Database file
6) Read the first record from the Alternatives file and assign to Alt
7) As long as there are records in the input file, do the following:
8) Read the next line and assign value to Comment File variable
9) If Comment File exists then do the following:
10) Read record from Comment File
11) Desc = Desc File record
12) As long as there are records, do the following:
13) Read record from Comment File
14) Append Carriage Return character, Line Feed character, and Comment File record to Desc
15) Loop back to step (12)
16) Write record to Alternatives Database file
17) Read the next line from Alternative file assign to Alt
18) Loop back to step (7)
19) Open the Criteria output Database file
20) Read the first record from the Criteria file and assign to Cri
21) As long as there are records in the input file, do the following:
22) Read the next line and assign value to Comment File variable
23) If Comment File exists then do the following:
24) Read record from Comment File
25)

(26) Desc = Desc File record
(27) As long as there are records, do the following:
(28)     Read record from Comment File
(29)     Append Carriage Return character, Line Feed character, and
            Comment File record to Desc
(30)     Loop back to step (27)
(31) Write record to Criteria Database file
(32) Read the next line from Criteria file and assign to Cri
(33) Loop back to step (22)
(34) Open the Results output Database File
(35) For i = 1 to the number of user directories
(36)     Open the current user's decision file
(37)     Read record and assign to num_alts
(38)     Read record and assign to num_cri
(39)     As long as there are records in the input file, do the following:
(40)         Read record and assign to alt
(41)         For ctr = 1 to num_cri
(42)             Read record and assign to cri (ctr)
(43)         Next ctr
(44)         Write record to Results Database file
(45)         Loop back to step (40)
(46) Next i
(47) Exit the Program

FIG.6B

EXPORTGM – Export Utility from GroupWare to DBase III database

1) Prompt User for path to Session Information file and verify that it exists
2) Fill a list box with each Session Name available
3) Set default source and destination paths as current directory
4) Verify user selections
5) Open the Labels output Database file
6) Read the first record from the Rows file and assign to Name
7) Assign Type as "Row"
8) As long as there are records in the input file, do the following:
9) Read the next line and assign value to Comment File variable
10) If Comment File exists then do the following:
11) Read record from Comment File
12) Desc = Desc File record
13) As long as there are records, do the following:
14) Read record from Comment File
15) Append Carriage Return character, Line Feed character, and Comment File record to desc
16) Loop back to step (13)
17) Write record to Labels Database file
18) Read the next line from Rows file and assign to Name
19) Loop back to step (8)
20)

FIG.7A

```
(21) Assign TotRows as total number of rows (also do this for TotCols)
(22) Repeat steps 6 - 9 for Columns and Relations
(23) Open the Results output Database file
(24) Open the Group results file
(25) Read record which contains all vote results (must parse)
(26) stpos = 2
(27) For Col = 1 to TotCols
(28)   For Row = 1 to TotRows
(29)     Rel = substring of input record (stpos for length of 5)
(30)     Write record to Results Database file
(31)     stpos = stpos + 6
(32)   Next Row
(33) Next Col
(34) Exit the Program
```

FIG.7b

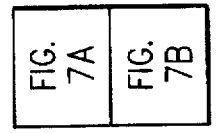

QFDCAPT Bridge Program (1)  /* QFDCAPT Bridge Program: produces QFD/CAPTURE Tool Import Files */
(2)
(3)  Initialize Program Variables
(4)  Setup Default Directories
(5)
(6)  Request User To Input Which QFD Room They Wish To Build
(7)
(8)  Verify Microsoft Access Export Files Exist For Selected Room
(9)
(10) Open Export File To Read
(11) Open QFD/CAPTURE Import File To Write To
(12)
(13) Build Import File Header Information
(14)
(15) Select
(16)   When QFD Room = WHAT Then
(17)     Extract Whats & Ratings From Export File
(18)     Build WHAT Import File Delimited Entries
(19)   When QFD Room = WHY Then
(20)     Extract Whys & Ratings From Export File
(21)     Build WHY Import File Delimited Entries
(22)   When QFD Room = HOW Then

(23) Extract Hows & Ratings From Export File
(24) Build HOW Import File Delimited Entries
(25) When QFD Room = HOWMUCH Then
(26) Extract Howmuches & Ratings From Export File
(27) Build HOWMUCH Import File Delimited Entries
(28) When QFD Room = WHAT Vs. WHY Then
(29) Extract Whats Versus Whys & Average Ratings From Export File
(30) Build WHAT versus WHY Import File Delimited Entries
(31) When QFD Room = WHAT Vs. HOW Then
(32) Extract Whats Versus Hows & Average Ratings From Export File
(33) Build WHAT versus HOW Import File Delimited Entries
(34) When QFD Room = HOW Vs. HOWMUCH Then
(35) Extract HOWs versus HOWMUCHes & Average Ratings From Export File
(36) Build HOW versus HOWMUCH Import File Delimited Entries
(37) When QFD Room = HOW versus HOW Then
(38) Extract Hows Versus Hows & Average Ratings From Export File
(39) Build HOW versus HOW Import File Delimited Entries
(40) End
(41)
(42) Build Import File Trailer Information
(43) Close Import & Export Files
(44)
(45) Exit

FIG. 8B

INTEGRATION OF GROUPWARE WITH QUALITY FUNCTION DEPLOYMENT METHODOLOGY VIA FACILITATED WORK SESSIONS

RELATED APPLICATIONS

This application claims priority under 35 U.S.C. § 120 as a continuation of U.S. patent application Ser. No. 08/616,238, filed Mar. 13, 1996, now abandoned, which is a continuation of U.S. patent application Ser. No 08/466,856, filed Jun. 6, 1995, now abandoned, which is a continuation of U.S. patent application Ser. No. 08/248,616, filed May 23, 1994, now abandoned, which is a continuation-in-part application of U.S. patent application Ser. No. 08/229,967, filed Apr. 19, 1994, now abandoned entitled "The Application of Groupware to ISO 9000 Registration via Facilitated Work Sessions".

U.S. patent applications Ser. No. 08/298,617, entitled "The Integration of Groupware with Activity Based Management via Facilitated Work Sessions", and 08/247,817, entitled "The Integration of Groupware with the Integrated Quality Control Methodology via Facilitated Work Sessions", filed concurrently herewith are assigned to the same assignee hereof and contain subject matter related, in certain respect, to the subject matter of the present application. The above-identified patent applications are incorporated herein by reference.

BACKGROUND OF THE INVENTION

1. Technical Field

This invention relates to a computer network application for sharing, combining, formatting, and printing into a predetermined document format information gathered from customers' descriptions of preferred product attributes, design characteristics defined by engineers designing the product, and input from any number of users or interfunctional work groups formed within an organization to produce quality products designed to meet customers' preferences. The application is implemented in a networked, multi-user environment. This invention effectuates the documentation of engineering and marketing decisions via facilitated computer-based, cooperative work sessions, thereby streamlining the process for quality product design.

2. Description of the Prior Art

The Quality Function Deployment (QFD) methodology is a difficult and time-consuming process for an organization to implement. The typical approach is to collect the "voice of the customer" information from in-depth interviews or focus groups and to collect engineering characteristics from inter-functional teams. However, a lack of tools means excessive resource and time is spent in collecting and organizing all of this information. Facilitated work sessions using GroupWare tools were developed in response to this need.

There are several applications that build the QFD "house of quality" that are commercially available today. The QFD methodology has been in use in Japan since 1972 and in the US since the early 1980s.

GroupWare

GroupWare refers to computer applications that allow groups of people to work together through the sharing of information. Most GroupWare products provide one or more of the following functions:

Calendar
Electronic Mail
Word Processing
Data or Document Management
Group Decision Support
Work Flow Support GroupWare products all run on a network, so that information is easily shared and accessible to all users who need it. LotusNotes is a GroupWare product that provides word processing and documentation management functions. TeamFocus is a GroupWare product that provides group decision support functions in an electronic meeting setting.

SUMMARY OF THE INVENTION

This invention comprises a network application for manipulating information gathered in a multi-user collaborative environment in order to conduct Quality Function Deployment sessions. The information gathered in the multi-user environment includes input such as comments and ideas from customers or from the cross-functional design team members. These are input into computer storage to be accessed by special programs for formatting and printing in predefined formats. GroupWare tools allow the team members to quickly organize their ideas, reach consensus, and make decisions. Customer wants and needs, importance, and perception can be programmed for automatic input into QFD applications. Product characteristics, importance, and their relationships can also be programmed for such automatic input. Measures and target values for the product design characteristics can be programmed for automatic input into QFD applications. User intervention is unnecessary after the information gathering session and before the import into the present invention QFD application. The initial facilitated work sessions document the customer's wants and needs, the importance of each, and the customer's perception of each attribute of the product or service. After that, the other facilitated work sessions with the cross-functional design teams determine those product characteristics that affect the customer wants and needs. The relationships between the customer attributes and the product characteristics are identified. Also identified are the relationships between each of the product characteristics. In another facilitated session, measures are identified for the product characteristics and target values are set.

The participants in the information gathering sessions are prompted to identify the QFD data for the "house of quality". Networked PC's and workstations facilitate the information gathering among the work groups, organization of the data gathered, and group approval of the final organized list. They also aid in the prioritization of the data and in defining the relationships between the data. Commercially available group decision support tools fit very well with these information gathering sessions. Commercially available database tools work well for storage of and access to the data that is collected in these information gathering sessions. Specialized bridge programs of the present invention automate the movement of data between these various tools. Commercially available GroupWare applications that support document management can make the latest version of reports and documents available to all personnel in the organization.

Other features and advantages of this invention will become apparent from the following detailed description of the presently preferred embodiment of the invention, taken in conjunction with the accompanying drawings.

BRIEF DESCRIPTION OF THE DRAWINGS

FIG. 3 is a functional flowchart of the session for documenting the customer wants and needs.

FIG. 4 is a functional flowchart of the session for documenting the product characteristics and relationships.

FIG. 5 is a pseudocode implementation of the TeamFocus EXPORTIO bridge program.

FIG. 6 is a pseudocode implementation of the TeamFocus EXPORTAE bridge program.

FIG. 7 is a pseudocode implementation of the TeamFocus EXPORTGM bridge program.

FIG. 8 is a pseudocode implementation of the QFDCAPT bridge program.

DESCRIPTION OF THE PREFERRED EMBODIMENT

Overview

Figure 1:
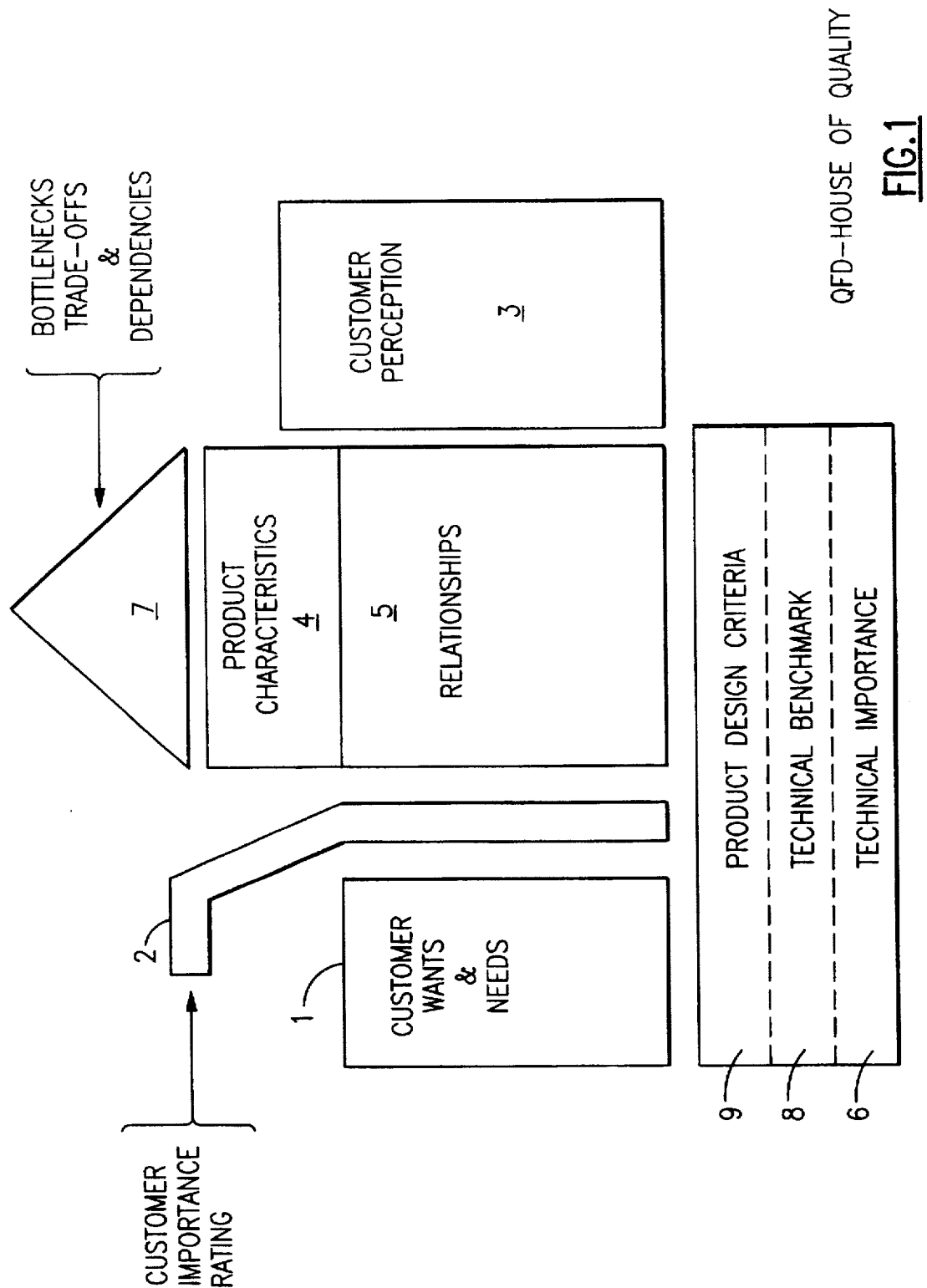
FIG. 1 is a sample "house of quality" document.

The Quality Function Deployment (QFD) methodology is based on the belief that products and services should be designed to reflect customers' wants and needs. Customer wants and needs, the "voice of the customer", must be communicated from marketing people to design engineers to manufacturing staff in order to ensure that customer attributes are incorporated into the products and services that are developed and sold. QFD builds a "house of quality", which is a conceptual map that can be used for interfunctional planning and communication. The "house of quality" shown in FIG. 1 contains:

1. The customer wants and needs (attributes) for the product.
2. The relative priority of the customer attributes (wants and needs).
3. Customer perceptions of competitor's products for those attributes.
4. The product characteristics that affect the customer attributes.
5. The relationship of the product characteristics to the customer attributes (strong or weak, positive or negative).
6. The technical importance rating of the product characteristics.
7. The relationships among the product characteristics, which indicate bottlenecks, tradeoffs, and dependencies.
8. Measurements of the product characteristics (benchmark).
9. Product design criteria.

Quality Function Deployment is a difficult and time-consuming process for an organization to implement. A lot of information has to be collected and organized into the "house of quality". The typical approach for the "voice of the customer" information is to conduct in-depth interviews or focus groups with a large number of customers. This is both costly and time-consuming since there are no tools applied to the task. The work is done in a manual fashion, either one-on-one or in small groups. Without GroupWare tools, taking notes during the session often slows the entire process down as the scribe must make sure everything written down is accurate.

The typical approach for the remainder of the house of quality is to have interfunctional teams identify the engineering characteristics that affect the customer attributes and their relationships to each of the customer attributes, i.e., strong or weak, negative or positive effect on the attribute. Again, this is a time-consuming process. In addition, team building and consensus are required for the teams to really be successful. This is difficult to achieve without GroupWare tools and a strong facilitator. Quite often, one or two people dominate the discussion during a session. As a result, valuable information is suppressed and fewer team members "buy in" to the decisions and tradeoffs that must be made.

Outside of the interviews and team meetings, other problems arise. The interviewer has to take time to prepare all of the documentation from notes taken during the session. There are software packages that will build the house of quality document; however, all of the information must be loaded into the software package.

GroupWare tools can help overcome some of the risks of the manual methods for Quality Function Deployment mentioned above. Team members can submit ideas anonymously, so that people uncomfortable speaking out in a group can share their ideas. Also, since ideas are submitted electronically via computer keyboard, nothing is forgotten or incorrectly recorded. Some time is saved, since all team members can type their ideas simultaneously. Finally, and probably most importantly, GroupWare helps the product design teams reach a consensus more rapidly than manual methods, because everyone has a voice and everyone has a vote.

Technical Background

This invention provides a more efficient means to collect and organize the data captured during Quality Function Deployment sessions and a process to transform the data into a format usable by existing database and QFD software applications.

The approach to Quality Function Deployment described here is being used successfully in IBM. IBM's GroupWare product, TeamFocus, is used in facilitated work sessions for Quality Function Deployment. TeamFocus is a GroupWare product that provides group decision support functions such as:

Electronic Brainstorming

Idea Organization

Voting

Topic Commenting

Alternative Evaluation

Group Outlining

Group Matrix

One type of facilitated work session documents the voice of the customer. Electronic meeting software such as IBM's TeamFocus or Ventana GroupSystems can quickly capture this information from groups of customers. After that, another type of facilitated work session collects the remaining information from the interfunctional teams. Electronic meeting software can collect this information much faster than in a traditional group meeting. The meeting facilitator helps the group achieve consensus, keeps them focused on the tasks, and moderates the discussions so that dominant personalities do not take over the meeting. Following the facilitated sessions the resulting data is stored in a database tool such as Microsoft Access, thus making the data available for import. The import file can be produced automatically by specialized bridge programs. The QFD reports can be stored in a another GroupWare tool for document management, such as LotusNotes, for access throughout the organization. The most recent version of the document can be stored online where it can be retrieved by any team member that requires it, provided they are on that network.

Customer Wants and Needs Exercise

This initial facilitated session surveys customers of the product or service to determine their requirements. Instead of using questionnaires, interviews, or focus groups, a facilitated session with a group of customers quickly captures their wants and needs regarding the product or service. These requirements or attributes of the product or service are assigned a relative importance. Also as part of this exercise the customer's satisfaction with each attribute of the product or service is rated, as are one or more competitors. Multiple sessions may be held with various market segments, as requirements may vary among the different market segments.

Figure 2:
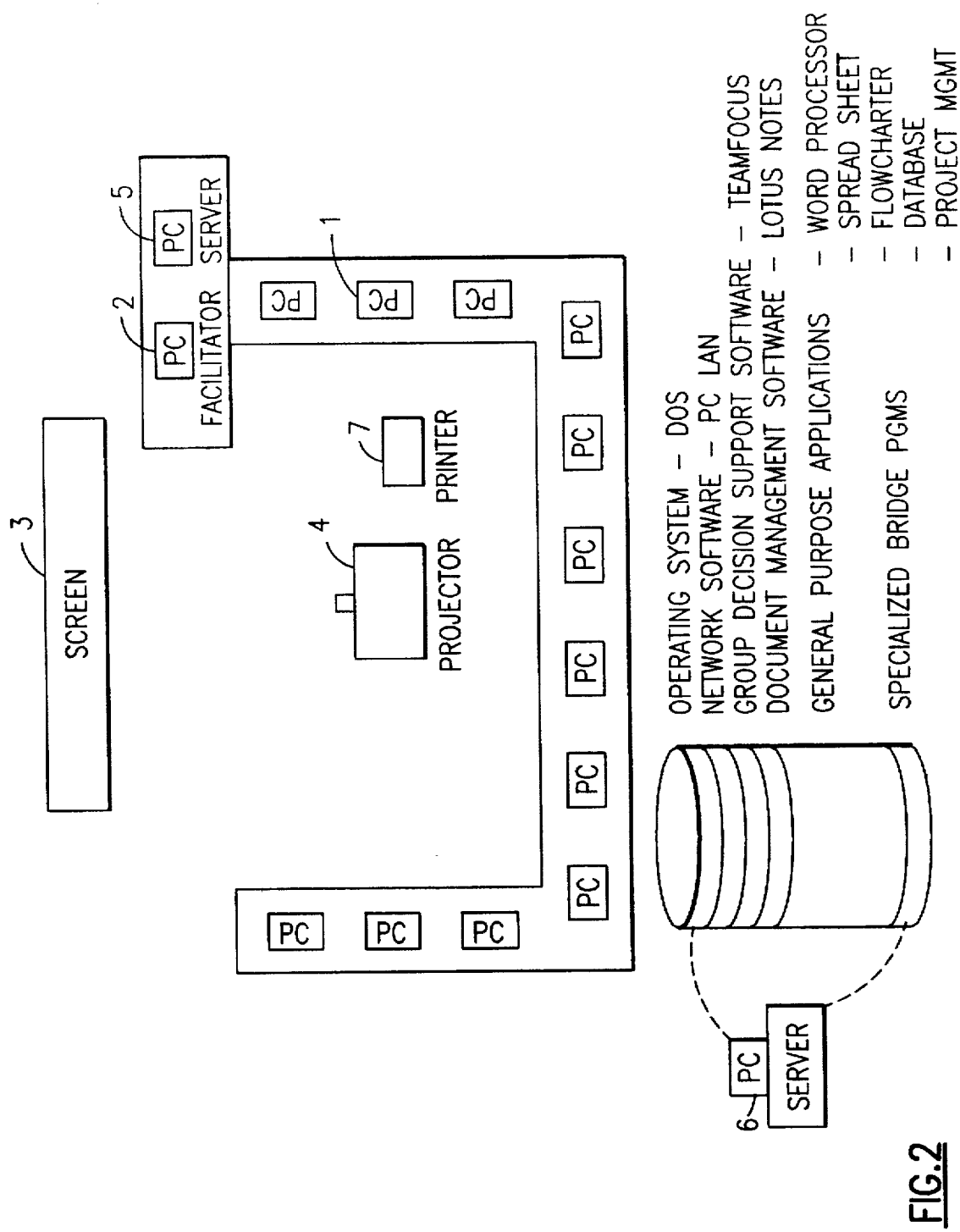
FIG. 2 is a representation of the overall system configuration and the various applications available on the file server.

Referring to FIG. 2, the customer group gathers in a joint meeting to provide input in response to questions provided by a facilitator, shown as a PC (2). The PC server (5), operating system and applications (6) are also shown. The session can also include a projector (4) and screen (3) for viewing and a printer (7) for hardcopy output. Each customer participates in the meeting via a PC (1) and the questions and answers may be selectively displayed on the screen or on each PC.

Referring to FIG. 3, the Customer Wants and Needs Exercise begins with a brainstorming exercise. A GroupWare tool such as IBM's TeamFocus is used for the brainstorming. In TeamFocus Idea Organization or Group Outliner, each customer suggests specific attributes or requirements that they have for the product or service, based on their usage of the product or service. The responses from the group are collected, reviewed, and consolidated into a list that everyone concurs with. Next, the team collects additional information about each requirement or attribute. This information could be supporting comments on why the requirements are needed or suggested measures of how much is needed. The additional information is collected using TeamFocus Group Outliner or TopicCommenter so that the customer's exact words are recorded. Next, the customers are asked to rate each requirement or attribute on a 1 to 10 scale against several criteria. First, the customers rate the attributes on their relative importance. Then, the customers indicate their level of satisfaction with the current product or service for each of the attributes. Finally, the customers indicate their level of satisfaction with one or more competitor's products for each of the attributes. The TeamFocus Alternative Evaluation or Group Matrix tool is used for this exercise, so that the group response is quickly and accurately captured and calculated. The TeamFocus session data is copied to diskette and exported to a database tool such as Microsoft Access for storage and later retrieval. An export file is created from the Microsoft Access database tool. This file is converted into an import file for the QFD/Capture tool by a specialized QFD bridge program. The session data is loaded into the QFD/Capture tool using QFD/Capture's import utility. The "house of quality" can then be constructed in the QFD/Capture tool. Hardcopy documentation may be generated from TeamFocus, the Microsoft Access database, or from the QFD/Capture tool. The documentation can also be stored in a GroupWare tool such as LotusNotes, a document management tool, for sharing the QFD information across the organization.

Product Characteristics Exercise

The Product Characteristics Exercise identifies all the product design characteristics that affect the customer requirements or attributes. Referring to FIG. 4, the Product Characteristics Exercise begins with a brainstorming exercise. A GroupWare tool such as IBM's TeamFocus is used for the brainstorming. In TeamFocus Idea Organization or Group Outliner, each member of the cross-functional design team suggests product characteristics that they are aware of that would influence the customer attributes. The responses from the group are collected, reviewed, consolidated into a list, and organized with concurrence from everyone in the group. Next the design team looks at the relationships between the customer attributes and the product characteristics. The relationships can range from "strong negative" to "neutral" to "strong positive". In TeamFocus Group Matrix, each member of the cross-functional design team suggests a rating for each of the relationships on a scale of −9 to +9. The responses from the group are collected, reviewed, and discussed to attain concurrence from everyone in the group. Next the design team looks at the relationships among the product characteristics. Again, the relationships can range from "strong negative" to "neutral" to "strong positive". In TeamFocus Group Matrix, each member of the cross-functional design team suggests a rating for each of the relationships on a scale of −9 to +9. The responses from the group are collected, reviewed, and discussed to attain concurrence from everyone in the group. The TeamFocus session data is then copied to diskette and exported to a database tool such as Microsoft Access for storage and later retrieval. An export file is created from the Microsoft Access database tool. This file is converted into an import file for the QFD/Capture tool by a specialized QFD bridge program. The session data is loaded into the QFD/Capture tool using QFD/Capture's import utility. The "house of quality" can then be constructed in the QFD/Capture tool. Hardcopy documentation may be generated from TeamFocus, the Microsoft Access database, or from the QFD/Capture tool. The documentation can also be stored in a GroupWare tool such as LotusNotes.

Measurement and Target Values Exercise

Additional facilitated sessions can similarly be run to identify other QFD information needed to complete the "house of quality". Other information might include measurements for each of the product characteristics, target values, and measurements of competitor's products. This information can be collected using TeamFocus Idea Organization or GroupOutliner, if needed, or simply collected by voice discussion if there is general agreement.

Bridge Programs

The TeamFocus sessions produce data files comprised of all the groups' responses to the facilitator's prompts for information. Upon execution of the export programs, these files are formatted into dBase III format for import into database tools, such as Microsoft Access. An export file from the database tool can be used by other bridge programs to construct import files for various tools such as ITI QFD/Capture. Reports and documents can be created from the TeamFocus tool, the database tool, or from the QFD tools.

EXPORTIO

Referring to FIG. 5 showing a pseudocode implementation of the bridge program EXPORTIO, this specialized program used by IBM bridges data from a TeamFocus Idea Organization (IO) session to a dBase III database file. The program begins with a prompt to the user to enter the path to the SESSION.DBF file created by TeamFocus. The program then verifies that the path entered is correct, and if so, reads the file to determine the names of all available sessions. These are entered into a list box control on the main form. The default source and destination paths are set as the current directory. They can be changed by the user if need be. The user can select as many sessions as desired to be exported. When OK is clicked, the EXPORT program validates all data fields entered by the user. If all is valid, the Session Id for the first selected session is used to determine input file names. The file containing all the IO list items and their associated comment filenames is named "LIST_x.IO" where x is the Session Id. The first LIST_x.IO record is read and assigned to the Idea field. The next line is then read and assigned to the Comment File Name variable. This represents the name of the file that contains any comments associated with that Idea. If the Comment File exists, then each line of the file is read and appended to the Comment field. Session Id, Idea, and Comment are then written to the dBase III database file. This process of reading and processing 2 LIST_x.IO lines at a time is then repeated until the file is empty.

EXPORTAE

Referring to FIG. 6 showing a pseudocode implementation of the bridge program EXPORTAE, this specialized program used by IBM bridges data from a TeamFocus Alternative Evaluation (AE) session to a dBase III database. The program begins with a prompt to the user to enter the path to the SESSION.DBF file created by TeamFocus. The program then verifies that the path entered is correct, and if so, reads the file to determine the names of all available sessions. These are entered into a list box control on the main form. The default source and destination paths are set as the current directory. They can be changed by the user if need be. The user can select as many sessions as desired to be exported. When OK is clicked, the EXPORT program validates all data fields entered by the user. If all is valid, the Session Id for the first selected session is used to determine input file names. The file containing all the AE alternatives and their associated comment file names is named "ALT_x.AE" where x is the Session Id. The first ALT_x.AE record is read and assigned to the Alt field. The next line is then read and assigned to the Comment File Name variable. This represents the name of the file that contains the description associated with that Alt. If the Comment File exists, then each line of the file is read and appended to the Desc field. Session Id, Alt, and Desc are then written to the dBase III Alternatives database file. This process of reading and processing 2 ALT_x.AE lines at a time is then repeated until the file is empty. The file containing all the AE Criteria and their associated comment file names is named "CRI_x.AE" where x is the Session Id. The first CRI_x.AE record is read and assigned to the Cri field. The next line is then read and assigned to the Comment File Name variable. This represents the name of the file that contains the description associated with that Cri. If the Comment File exists, then each line of the file is read and appended to the Desc field. Session Id, Cri, and Desc are then written to the dBase III Criteria database file. This process of reading and processing 2 CRI_x.AE lines at a time is then repeated until the file is empty. Now the results must be created. The file that contains each user's decision data is located in that user's directory and is called "DEC_x.AE" where x is the Session Id. The first line of this file contains the number of alternatives. The second line is the number of criteria. The remainder of the data is grouped into alternative and associated criteria result. Loop through this data assigning the first record in the group to alternative. Then read as many lines as there are criteria and assign to criteria (counter) field.

EXPORTGM

Referring to FIG. 7 showing a pseudocode implementation of the bridge program EXPORTGM, this specialized program used by IBM bridges data from a TeamFocus Group Matrix (GM) session to a dBase III database. The program begins with a prompt to the user to enter the path to the SESSION.DBF file created by TeamFocus. The program then verifies that the path entered is correct, and if so, reads the file to determine the names of all available sessions. These are entered into a list box control on the main form. The default source and destination paths are set as the current directory. They can be changed by the user if need be. The user can select as many sessions as desired to be exported. When OK is clicked, the EXPORT program validates all data fields entered by the user. If all is valid, the Session Id for the first selected session is used to determine input file names. The file containing the GM rows and their associated comment file names is named "ROW_x.GM" where x is the Session Id. The first ROW_x.GM record is read and assigned to the Row field. The type is assigned as "ROW". The next line is then read and assigned to the Comment File Name variable. This represents the name of the file that contains the description associated with that Row. If the Comment File exists, then each line of the file is read and appended to the Comment field. Session Id, Row, Type, and Comment are then written to the dBase III Alternatives database file. This process of reading and processing 2 ROW_x.GM lines at a time is then repeated until the file is empty. The file containing the GM columns and their associated comment file names is named "COL_x.GM" where x is the Session Id. The first COL_x.GM record is read and assigned to the Column field. The type is assigned as "COL". The next line is then read and assigned to the Comment File Name variable. This represents the name of the file that contains the description associated with that Column. If the Comment File exists, then each line of the file is read and appended to the Comment field. Session Id, Column, Type, and Comment are then written to the dBase III Labels database file. This process of reading and processing 2 Col_x.GM lines at a time is then repeated until the file is empty. The file containing the GM columns and their associated comment file names is named "COL_x.GM" where x is the Session Id. The first COL_x.GM record is read and assigned to the Column field. The type is assigned as "COL". The next line is then read and assigned to the Comment File Name variable. This represents the name of the file that contains the description associated with that Column. If the Comment File exists, then each line of the file is read and appended to the Comment field. Session Id, Column, Type, and Comment are then written to the dBase III Labels database file. This process of reading and processing 2 REL_x.GM lings at a time is then repeated until the file is empty. The file containing the GM Relations and their associated comment file names is named "REL_x.GM" where x is the Session Id. The first REL_x.GM record is read and assigned to the Relation field. The type is assigned as "REL". The next line is then read and assigned to the Comment File Name variable. This represents the name of the file that contains the description associated with that Relation. If the Comment File exists, then each line of the file is read and appended to the Comment field. Session Id, Relation, Type, and Comment are then written to the dBase III Labels database file. This process of reading and processing 2 REL_x.GM lines at a time is then repeated until the file is empty. Now the results must be created. The file that contains the group's results is called GRUP_x.GM where x is the Session Id. This file contains 1 line of data which must be parsed to obtain the results matrix. The data is grouped by column, so the results for each row associated with column 1 appear first, then all row data for column 2, etc. Loop through this data, parsing out the Relation value and outputting Row, Col, Rel, and Session Id the GM Results dBase III file.

QFD Bridge

Referring to FIG. 8 showing a pseudocode implementation of the bridge program QFDCAPT, this specialized program used by IBM bridges data from a TeamFocus session stored in Microsoft Access to a commercially available QFD application such as ITI QFD/Capture. The program initializes program variables and directories and then prompts the user to input what "rooms" of the "house of quality" are being imported to ITI QFD/Capture. The program then checks to make sure the appropriate Microsoft Access export files exist. An export file should exist for each "room" of the "house of quality" in QFD/Capture. For example, the customer wants and needs exercise should result in files for the "WHAT", "WHY", and "WHAT vs WHY" "rooms" of the "house of quality". The program then opens a file which is the QFD/Capture import file. Next, it writes the appropriate header information to the QFD/Capture import file. For each "room" in the "house of quality" that was selected, the appropriate information is read from the Microsoft Access export file and written to the QFD/Capture import file. When all "rooms" have been handled, the program writes the appropriate trailer information to the QFD/Capture file and closes the file. At this point, the QFDCAPT program ends.

For some QFD tools, it is possible to execute the import command right from the bridge program. If this is desired, the appropriate command can be inserted after the import file is closed and before the program ends.

Advantages Over the Prior Art

The combination of facilitated work sessions and GroupWare products, when applied to the Quality Function Deployment methodology, allows an organization to build its "house of quality" in less time than it would otherwise have required. The facilitated work sessions allow the interfunctional teams to focus their efforts and make effective use of their time. They also promote teamwork and ownership of the design decisions and tradeoffs that are necessary in product development. The GroupWare tools allow the work team to quickly collect, organize, and document their ideas. At the end of the facilitated session, the team has immediate documentation of their work, which can be loaded into QFD software packages for further analysis. The GroupWare tools also allow for the proper management of the documentation, making immediate access throughout the organization possible.

Alternative Embodiments

It will be appreciated that, although specific embodiments of the invention have been described herein for purposes of illustration, various modifications may be made without departing from the spirit and scope of the invention. In particular, although this invention was developed specifically to construct the "house of quality" for customer requirements and engineering requirements, these methods need not be limited to that. Other "houses of quality" such as business requirements, parts characteristics, operations requirements, and production planning can also be developed with this invention. This invention would also apply to the Dynamic QFD methodology that links the various "houses of quality" into one. Other bridge programs can similarly be written for other QFD applications. The advantages offered by the bridge programs are in time saving and accuracy, as the data need not by manually keyed into each tool. Accordingly, the scope of protection of this invention is limited only by the following claims and their equivalents.

We claim:

1. An automated product or service design process, comprising the steps of:

providing a computer system with a multitude of workstations in a room, with respective input means;

providing a multitude of electronic video displays in the room with each of the workstations within view of at least one of the displays;

providing an editing system for a database in the computer system;

meeting with a multitude of customers in the room;

prompting the customers to input wants and needs related to a product or service into the computer system;

inputting signals indicating wants and needs into the computer system simultaneously by a plurality of the customers at multiple respective workstations;

displaying combined input signals indicating wants and needs of the plurality of customers of the plurality of customers to the simultaneously to the multitude of customers on one or more video displays of the computer system;

reaching consensus among the customers for verifying the signals indicating wants and needs;

inputting signals into the editing system to indicate verified wants and needs related to the product or service;

prompting the multitude of customers to indicate priorities of the verified wants and needs;

indicating priorities of the wants and needs by a plurality of the customers;

inputting signals into the system indicating the customer's priorities for the verified wants and needs;

displaying signals indicating priorities to all the customers on one or more video displays of the computer system;

reaching consensus among the customers for verifying the priorities indicated by the priority signals;

inputting signals into the editing system to indicate the verified priorities of the needs and wants;

providing QMF program means for implementing the quality function deployment methodology in the computer system.

2. The process of claim 1 further comprising the steps of:

providing a data base system in the computer system;

providing bridge means including programmed means for automatically converting signals indicating names of products and services, indicating needs and wants associated with the products or services and signals indicating priorities of the needs and wants for the products or services from storage structures for editing system to storage structures for the data base system;

programming the data base system for storing signals indicating products or services and signals indicating needs and wants and signals indicating a relationship between the needs and wants and a product or service and for retrieving the signals indicating needs and wants depending on an input signal indicating a product or service;

programming the data base system for storing the signals indicating priorities of the needs and wants and a relationship between the priorities and the needs and wants and for retrieving the signals indicating priorities of the needs and wants depending on an input signal indicating needs and wants for a product or service;

inputting into the computer system to initiate automatic conversion of the signals from a structure for editing system to a structure for the data base system;

automatically converting signals indicating needs and wants from a structure for the editing system to a structure for the data base system; and automatically converting the signals indicating priorities of needs and wants from a structure for the editing system to a structure for the data base system.

3. The process of claim 1 further comprising the steps of:

prompting the multitude of customers to indicate a benchmark level of satisfaction with an existing product or service with respect to the verified wants and needs;

indicating levels of satisfaction by a plurality of the customers;

inputting signals into the computer system indicating the levels of satisfaction with an existing product or service with respect to the verified wants and needs;

displaying the input signals indicating levels of satisfactions to all the multitude of customers at one or more of the displays of the computer system;

reaching consensus among the customers for verifying the levels of satisfaction; and inputting into the editing system to document the verified levels of satisfaction.

4. The process of claim 2 further comprising:

the step of providing bridge means includes providing programmed means for programming the data base for storing signals indicating levels of satisfaction with an existing product or service, and signals indicating a relationship between the levels of satisfaction and the existing product or service and a relationship between the existing product or service and another product or service and for retrieving the signals indicating the levels of satisfaction depending on an input signal indicating a product or service;

automatically converting signals indicating levels of satisfaction with an existing product from a structure for the editing system to a structure for the data base system.

5. The process of claim 1 further comprising the steps of:

prompting the multitude of customers, to input into the computer system, characteristics of one or more products or services that relate to the signals indicating verified wants and needs;

inputting signals indicating the characteristics into the computer system simultaneously by a plurality of the customers at multiple respective workstations;

displaying combined input signals from the multitude of customers indicating simultaneously to the multitude of customers on one or more of the displays of the computer system;

reaching consensus among the customers to verify the characteristics; and inputting signals into the editing system to indicate the verified characteristics.

6. The process of claim 5 further comprising the step of:

automatically converting signals indicating verified characteristics from a structure for the editing system to a structure for the data base system.

7. The process of claim 6 further comprising the steps of:

prompting the multitude of customers, to indicate priorities of each of the verified characteristics of the products or services in satisfying respective wants and needs;

indicating priorities of the characteristics, by a plurality of the customers at multiple respective workstations;

inputting signals indicating the priorities of the characteristics;

displaying all the input signals indicating priorities of the characteristics to all the customers on one or more video displays of the computer system;

reaching consensus to verify the priorities of the characteristics; and inputting into the editing system to document of the verified priorities of the characteristics.

8. The process of claim 5 further comprising:

automatically converting signals indicating verified priorities from a structure for the editing system to a structure for the data base system.

9. An automated product or service design process, comprising the steps of:

providing a computer system with a multitude of workstations in a room with respective input means;

providing one or more displays with each of the workstations within view of at least one of the displays;

providing an editing system for a database in the computer system;

meeting with a multitude of product designers in the room;

providing to the product designers, signals indicating the verified customer's wants and needs and signals indicating verified customer's priority of wants and needs related to a product or service;

providing signals indicating characteristics of one or more products or services that relate the wants and needs of the customers;

prompting the designers to input into the computer system, relationships between characteristics of products or services;

inputting signals indicating relationships between the characteristics into the computer system simultaneously by a plurality of the designers at multiple respective workstations;

displaying combined input signals of the plurality of designers indicating relationships between the characteristics simultaneously to the multitude of designers on one or more video displays;

reaching consensus among the designers for verifying the relationships between the characteristics;

inputting into the editing system to indicate the verified relationships between the characteristics;

providing QMF program means for implementing the quality function deployment methodology in the computer system.

10. The process of claim 9 further comprising the steps of:

providing a data base system in the computer system;

programming the data base for storing signals indicating levels of satisfaction with an existing product or service, and signals indicating a relationship between the levels of satisfaction and the existing product or service and a relationship between the existing product or service and another product or service and for retrieving the signals indicating the levels of satisfaction depending on an input signal indicating a product or service;

providing bridge means including programmed means for automatically converting signals indicating names of products and services, indicating needs and wants associated with the products or services and signals indicating priorities of the needs and wants for the products or services from storage structures for editing system to storage structures for the data base system;

inputting into the computer system to initiate automatic conversion of signals from a structure for the editing system to a structure for the data base system; and automatically converting the signals indicating relationships between characteristics from a structure for the editing system to a structure for the data base system.

11. The process of claim 9 in which the step of providing signals indicating characteristics of one or more products or services that relate the verified wants and needs of the customers, includes the steps of:

prompting the designers to input into the computer system characteristics of one or more products or services that relate to the verified wants and needs of the customers;

inputting signals indicating the characteristics into the computer system simultaneously by a plurality of the designers at multiple respective workstations;

displaying combined input signals of the plurality of designers indicating characteristics simultaneously to the multitude of designers on one or more video displays;

reaching consensus among the designers to verify the characteristics; and inputting into the editing system to document the verified characteristics.

12. The process of claim 9 in which the step of providing signals indicating priorities of the respective characteristics of the products or services in satisfying wants and needs of the customers;

inputting signals indicating priorities of the, characteristics into the computer system simultaneously by a plurality of the designers at multiple respective workstations;

displaying combined input signals of the plurality of designers indicating priorities of the characteristics simultaneously to the multitude of designers on one or more displays;

reaching consensus to verify the priorities of the characteristics; and inputting into the editing system to document the verified priorities of the characteristics.

13. The process of claim 9 further comprising the steps of:

prompting the designers to input into the computer system, one or more measurements of each of the verified characteristics of the products or services;

inputting signals indicating measurements of respective characteristics into the computer system simultaneously by a plurality of the designers at multiple respective workstations;

displaying the combined signals of the plurality of designers indicating measurements of the respective characteristics simultaneously to the multitude of designers on one or more displays of the computer system;

reaching consensus among the designers to verify the measurements of the characteristics; and inputting signals into the editing system to indicate the verified measurements of the characteristics.

14. The process of claim 10 further comprising the steps of:

programming the data base system for storing signals indicating products or services and signals indicating needs and wants and signals indicating a relationship between the needs and wants and a product or service and for retrieving the signals indicating needs and wants depending on an input signal indicating a product or service;

providing bridge means including programmed means for automatically converting signals indicating names of products and services, indicating needs and wants associated with the products or services and signals indicating priorities of the needs and wants for the products or services from storage structures for editing system to storage structures for the data base system;

programming the data base system for storing signals indicating products or services and signals indicating needs and wants and signals indicating a relationship between the needs and wants and a product or service and for retrieving the signals indicating needs and wants depending on an input signal indicating a product or service;

automatically converting signals indicating verified measurement from a structure for the editing system to a structure for the data base system.

15. The process of claim 13 further comprising the steps of:

prompting the designers to indicate target values for respective measurements of respective characteristics of the products or services;

indicating target values by a plurality of the designers;

inputting signals indicating the target value for the respective measurement of the characteristics into the computer system;

displaying the input target values for the respective measurements of the characteristics simultaneously to the multitude of designers on one or more displays of the computer system.

16. The process of claim 15 further comprising the step of:

automatically converting signals indicating verified target values from a structure for the editing system to a structure for the data base system.

17. The process of claim 13 further comprising the steps of:

prompting the designers to indicate benchmark values for the measurements of the characteristics of a competing product or service;

indicating the benchmark values for the respective measurements of the characteristics of the competing product of service by a plurality of the designers;

inputting signals indicating the benchmark values for the respective measurements of the characteristics into the computer system;

displaying the input benchmark values for the respective measurements of the characteristics of the competing products or services to the multitude of designers on one or more displays of the computer system;

reaching consensus to verify the benchmark values of the measurements of the characteristics of the competing products or services; and inputting into the editing system to document the verified benchmark values of the measurements of the characteristics of the competing products or services.

18. The process of claim 14 further comprising the step of:

automatically converting signals indicating verified benchmark values of measurements for competing products or services from a structure for the editing system to a structure for the data base system.

19. An automated product or service design process, comprising the steps of:

providing a computer system with one or more workstations with respective input means and display means;

providing a programmable data base system in the computer system;

programming the data base with means for storing and means for retrieving and structures for storing signals indicating wants and needs of customers and indicating relation to a product or service;

programming the data base with means for storing and means for retrieving and structures for storing signals indicating customer's priorities of respective wants and needs for the respective product or service and signals indicating relation to a want or need;

programing the data base with means for storing and means for retrieving and structures for storing signals indicating characteristics of a respective product or service related to the respective wants and needs for the product or service and signals indicating a relation to a product or service;

programing the data base with means for storing and means for retrieving and structure for storing signals indicating priorities for respective characteristics for the respective products or services;

providing signals and storing signals in the data base indicating verified wants and needs of customers related to a product or service;

providing signals and storing signals in the data base indicating verified priorities of each of the customer's wants and needs related to the product or service;

providing signals and storing signals in the data base indicating verified wants and needs of customers related to a product or service;

providing signals and storing signals in the data base indicating verified priorities of each of the customer's wants and needs related to the product or service;

providing signals and storing signals in the data base indicating characteristics of one or more products or services;

providing signals and storing signals in the data base indicating priorities of the respective characteristics of the products or services in satisfying the signals indicating wants and needs of the customers;

providing QMF program means for implementing the quality function deployment methodology in the computer system;

providing bridge means including one or more bridge programs for automatically converting signals from a structure in the data base to a structure for use in the QMF program means;

automatically converting signals indicating wants and needs related to a product or service, from a structure for the data base to a structure for the QMF means;

automatically converting signals indicating priorities of respective wants and needs related to a respective product or service, from a structure for the data base to a structure for the QMF means; and automatically converting signals indicating priorities of the respective characteristics in satisfying customers wants and needs related to respective products or from a structure for the data base to a structure for the QMF means.

20. The process of claim 19 further comprising the steps of:

programming the data base with means for storing and means for retrieving and structures for storing signals indicating descriptions of relationships between characteristics of a product or service and signals indicating a relationship between the respective product or service and the description of relationships between characteristics;

programming the data base with means for storing and means for retrieving and structures for storing signals indicating measurements of the characteristics of a product or service and signals indicating a relation between the respective product or service and the measurements;

programming the data base with means for storing and means for retrieving and structures for storing signals indicating benchmark values for the measurements of competing products or services and signals indicating a relation between the respective product or service and the benchmarks;

programming the data base with means for storing and means for retrieving and structures for storing signals indicating target values for the measurements of the product or service and signals indicating the relation between the product or service and the target values;

providing signals and storing signals in the data base indicating relationships between characteristics of a product or service;

providing signals and storing signals in the data base indication measurements of the characteristics of a product or service;

providing signals and storing signals in the data base indicating benchmark values for the measurements of competing products or services;

providing signals and storing signals in the data base indicating target values for the measurements of the product or service;

automatically converting signals indicating relationships between characteristics of a product or service, from a structure for the data base to a structure for the QMF means;

automatically converting signals indicating measurements of characteristics of a product or service, from a structure for the data base to a structure for the QMF means;

automatically converting signals indicating values for the measurements of the characteristics for competing products or services, from a structure for the data base to a structure for the QMF means; and automatically converting signals indicating target values for the measurements of the characteristics of products or services in satisfying the signals indicating wants and needs of the customers, from a structure for the data base to a structure for the QMF means.

21. A computer system for automated product or service design, comprising:

a multitude of workstations with respective input means in a room;

one or more video displays in position for viewing at least one of the displays from each of the workstations;

means to input signals simultaneously by a plurality of the customers at multiple respective workstations, for indicating wants and needs of customer's related to a product or service and means to input signals for indicating customer's prioritization of the wants and needs related to the product or service;

automatic means for storing in the computer system, the input signals indicating wants and needs and the input signals indicating the prioritizations;

automatic means for displaying on one or more of the displays of the computer system, the combined signals indicating wants and needs input by the plurality of the customers simultaneously viewable by all the customers and the prioritizations simultaneously viewable by all the customers;

an editing system in the computer to selectively document the signals indicating verified wants and needs related to the product or service and to selectively document the verified prioritization of the wants and needs;

a data base system in the computer system with programmed means for automatically receiving and programmed means for automatically transmitting and structure means for storing customer signals indicating verified wants and needs of customers related to a product and verified customer prioritization of the wants and needs;

QMF program means for implementing the quality function deployment methodology in the computer system;

means for initiating automatic conversion of the documentation from a structure for the editing system to a structure for the data base system;

means for automatically converting the signals indicating needs and wants from a structure for the editing system to a structure for the data base system;

means for automatically converting the signals indicating priorities of needs and wants from a structure for the editing system to a structure for the data base system; and means for automatically converting the signals indicating priorities of needs and wants from a structure for editing system to a structure for the data base system.

22. The system of claim 21 in which the automatic means for reaching consensus includes means for inputting votes and means for automatically tabulating the votes and displaying the tabulation on the one or more displays to all the customers.

23. The system of claim 21 in which the data base system further includes:
programmed means for receiving and programmed means for transmitting and structure means for storing levels of customer satisfaction with an existing product or service; and
means for automatically converting signals indicating levels of satisfaction with an existing product from a structure for the editing system to a structure for the data base system.

24. The system of claim 21 in which the data base system further includes:
programmed means for receiving and programmed means for transmitting and structure means for storing signals indicating characteristics of a product or service;
the system further comprises means for automatically converting signals indicating characteristics of a products or services from a structure for the editing system to a structure for the data base system.

25. The system of claim 21 in which the data base system further includes:
programmed means for receiving and programmed means for transmitting and structure means for storing signals indicating priorities of characteristics of products or services; and
the system further includes means for automatically converting the signals indicating priorities of characteristics of products or services from a structure for the editing system to a structure for the data base system.

26. A computer system for automated product or service design, comprising:
a multitude of workstations with respective input means in a room;
one or more video displays in position for viewing at least one of the displays from each of the workstations;
means to input signals simultaneously by a plurality of product designers at multiple respective workstations, for indicating relationships between characteristics of a product or service;
automatic means for storing in the computer system, the input signals indicating characteristics of a product or service;
an editing system for producing a verified document from input from a plurality of workstations;
automatic means for displaying characteristics of one or more products or services that relate to customers signals indicating wants and needs to every workstations on the one or more displays;
means for inputting the relationships between the characteristics into the computer system simultaneously by a plurality of the designers at multiple respective workstations;
means for displaying the combined input relationships between the characteristics, input by the plurality of the designers at all of the workstations on the one or more video displays;
automatic means for reaching consensus among the designers for verifying the relationships between the characteristics;
means for inputting into the editing system to document the relationships between the characteristics;
a data base system in the computer system, including:
programmed means for automatically receiving and programmed means for automatically transmitted and structure means for storing the signals indicating the relationships between characteristics;
QMF program means for implementing the quality function deployment methodology in the computer system;
means for inputting into the computer system to initiate automatic conversion of documentation from a structure for the editing system to a structure for the data base system; and
means for automatically converting the signals indicating relationships between characteristics from a structure for the editing system to a structure for the data base system.

27. The system of claim 26 in which:
the data base further includes signals indicating the measurement of predetermined characteristics of a product or service; and
means for automatically converting signals indicating measurements of the predetermined characteristics of a product or service from a structure for the editing system to a structure for the data base system.

28. The system of claim 26 in which:
the data base further includes predetermined signals indicating target values for the measurement of a product or service; and
the system further comprises automatic means for converting signals indicating target values for measurements for a product or service from a structure for the editing system to a structure for the data base system.

29. The system of claim 26 in which:

the data base further includes signals indicating benchmark values for a measurement of existing products or services similar to the product or service;

the system further comprises automatic means for converting signals indicating benchmark values of measurements for existing products or services similar to the product or service, from a structure for the editing system to a structure for the data base system.

30. A computer system for automated product or service design, comprising:

one or more work stations with respective input means in a room;

one or more video display positioned for viewing at least one of the displays from each work station;

a data base system in the computer system programmed with information stored in storage structures and programmed means for retrieving the information from the storage structures, such storage structures including:

structures for signals indicating wants and needs related to a product or service;

structures for a signals indicating priorities of customer's wants and needs related to the product or service;

structures for characteristics of one or more products or services that relate the customer's wants and needs; and structures for determinations of the signals indicating priorities of the respective characteristics of the products or services in satisfying the signals indicating wants and needs of the customers;

QMF program means for implementing the quality function deployment methodology in the computer system;

bridge means including on for more bridge programs, for converting structures in the data base to a structure for use in the QMF program means, and including:

means for converting signals indicating wants and needs related to a product or service, from a structure for the data base to a structure for the QMF means;

means for converting signals indicating priorities of each of the wants and needs related to the product or service, from a structure for the data base to a structure for the QMF means;

means for converting characteristics of one or more products or services, that relate the customers signals indicating wants and needs, from a structure for the data base to a structure for the QMF means; and means for converting signals indicating priorities of the respective characteristics of the products or services in satisfying the wants and needs of the customers, from a structure for the data base to a structure for the QMF means.

* * * * *